US 7,149,708 B2

(12) United States Patent
Haulk et al.

(10) Patent No.: US 7,149,708 B2
(45) Date of Patent: Dec. 12, 2006

(54) METHODS AND APPARATUS FOR PERFORMING RECURRING ELECTRONIC SHELF LABEL TRANSACTIONS

(75) Inventors: Kevin Winton Haulk, Griffin, GA (US); Cheryl Kay Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 747 days.

(21) Appl. No.: 10/105,969

(22) Filed: Mar. 25, 2002

(65) Prior Publication Data
US 2003/0182192 A1 Sep. 25, 2003

(51) Int. Cl.
G06Q 20/00 (2006.01)
(52) U.S. Cl. .................................................. 705/16
(58) Field of Classification Search ................ 705/16, 705/26, 27, 20, 23, 21, 28; 345/1.1; 340/5.91; 707/1
See application file for complete search history.

(56) References Cited

U.S. PATENT DOCUMENTS

| | | | |
|---|---|---|---|
| 6,269,342 B1 * | 7/2001 | Brick et al. ................... 705/20 |
| 6,662,165 B1 * | 12/2003 | Saliceti et al. ................ 705/20 |
| 6,715,675 B1 * | 4/2004 | Rosenfeld .................... 235/383 |
| 6,715,676 B1 * | 4/2004 | Janning ........................ 235/383 |
| 6,753,830 B1 * | 6/2004 | Gelbman ....................... 345/55 |
| 6,764,002 B1 * | 7/2004 | Zimmerman et al. ........ 235/383 |
| 6,781,580 B1 * | 8/2004 | Crooks ......................... 345/211 |
| 6,816,840 B1 * | 11/2004 | Goodwin, III ................ 705/20 |
| 2002/0016739 A1 * | 2/2002 | Ogasawara ................... 705/22 |
| 2003/0135419 A1 * | 7/2003 | Haulk et al. .................. 705/20 |

* cited by examiner

Primary Examiner—Ronald Laneau
(74) Attorney, Agent, or Firm—Priest & Goldstein, PLLC; Charles Maney

(57) ABSTRACT

An electronic price label (ESL) system for performing recurring ESL transactions which occur in a periodic fashion. In one aspect, an ESL manager records and schedules messages to the ESL. When a transaction request directed to an ESL is created or issued by a client application, multiple pieces of information may be provided by that client to the ESL manager, indicating what action is to be taken. To allow for the scheduling of recurring transactions, recurrence information for the transaction may also be specified by the client application. The recurrence information may include a start date and time, and a recurrence period. After the transaction has been processed, the ESL manager looks at the recurrence period and if the recurrence period is a non-zero value, the ESL manager adds the recurrence period to the start date and time to generate a new start date and time. The ESL manager then generates a new transaction and stores this new transaction in a transaction log table to be processed at the future appropriate time. This new transaction is essentially identical to the old, with the exception of the incremented a start date and time, and unique transaction identifier.

14 Claims, 3 Drawing Sheets

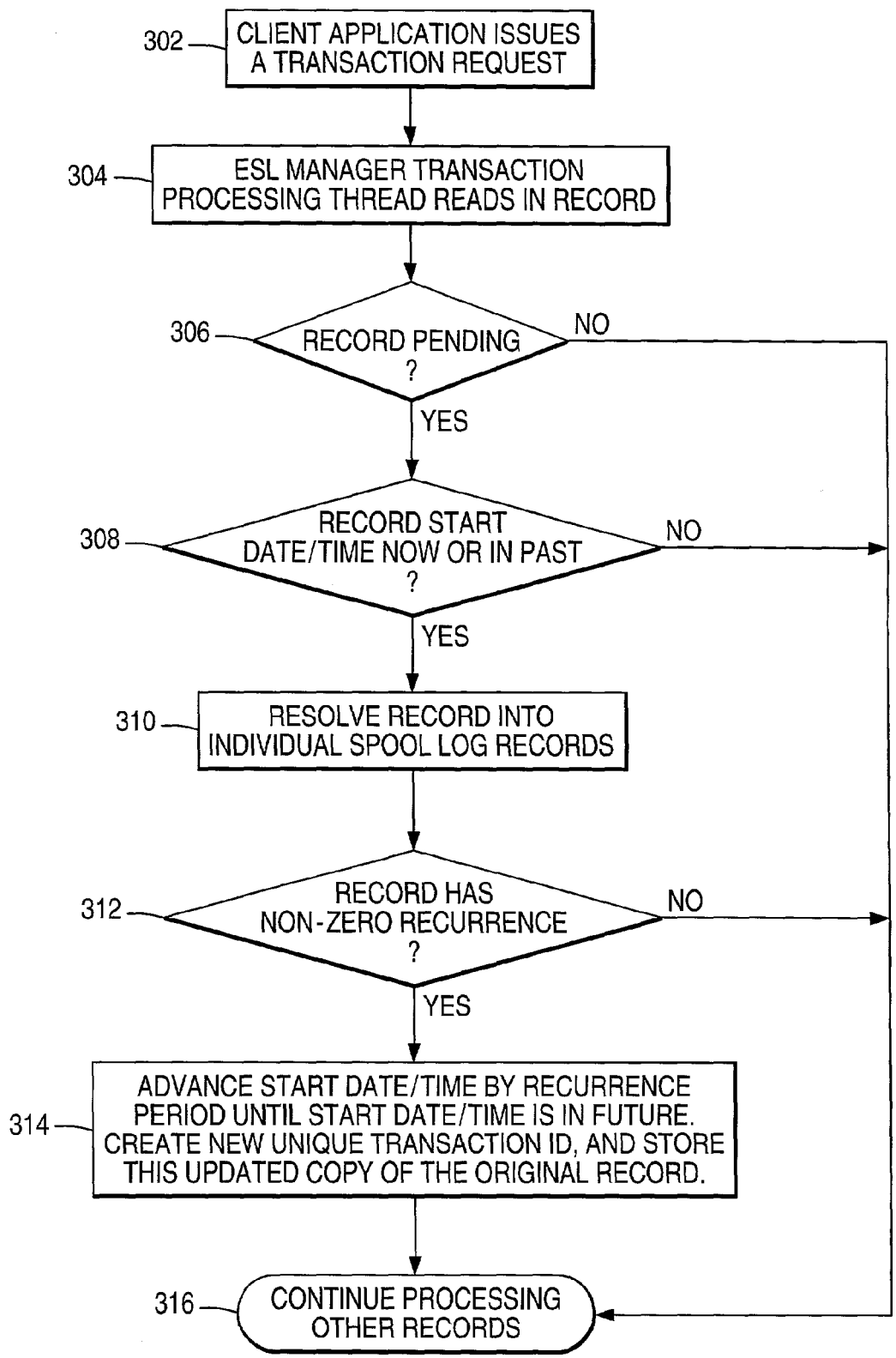

METHODS AND APPARATUS FOR PERFORMING RECURRING ELECTRONIC SHELF LABEL TRANSACTIONS

FIELD OF THE INVENTION

The present invention relates generally to improvements in electronic shelf label (ESL) systems used in transaction establishments. More specifically, the present invention relates to improved methods and apparatus for performing recurring ESL transactions which occur in a periodic fashion.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including register update messages, to the ESLs.

Many operations which involve ESLs are periodic in nature, recurring again and again at predetermined times. For example, a retail establishment may want to perform a bedcheck of all the store's ESLs every evening to verify that each ESL is displaying the correct information. Typical prior ESL systems could not provide such a capability without a client application specifically issuing a request for such a transaction again and again each time the transaction is desired to occur. Therefore, it would be desirable to provide an ESL system and method that provides for an ESL manager which allows a single request to cause recurring transactions to be scheduled and executed at specified intervals.

SUMMARY OF THE INVENTION

The present invention advantageously provides methods and apparatus for an improved electronic shelf label (ESL) system. In one aspect, the present invention includes an ESL for displaying information relating to an item associated with the ESL. The ESL includes a plurality of registers for storing information controlling the content and formatting of the information displayed by the ESL's display. A host computer system includes an ESL manager which records and schedules messages to the ESL. When a transaction request directed to the ESL is created or issued by a client application, multiple pieces of information may be provided by that client to the ESL manager, indicating what action is to be taken. To allow for the scheduling of recurring transactions, recurrence information for the transaction may also be specified by the client application. The recurrence information may include a start date and time, and a recurrence period. After the transaction has been processed, the ESL manager looks at the recurrence period and if the recurrence period is a non-zero value, the ESL manager adds the recurrence period to the start date and time to generate a new start date and time. The ESL manager then generates a new transaction and stores this new transaction in a transaction log table to be processed at the future appropriate time. This new transaction is essentially identical to the old, with the exception of the incremented start date and time, and unique transaction identifier.

A more complete understanding of the present invention, as well as further features and advantages of the invention, will be apparent from the following detailed description and the accompanying drawings.

BRIEF DESCRIPTION OF THE DRAWINGS

FIG. 3 shows a method of processing recurring ESL transactions in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021 filed Jan. 11, 2001 entitled "Methods and Apparatus for Performing Delta Updates of an Electronic Shelf Label", U.S. patent application Ser. No. 10/044,610 filed Jan. 11, 2001 entitled "Methods and Apparatus for Intelligent Data Bedcheck of an Electronic Shelf Label", U.S. patent application Ser. No. 10/044,020 filed Jan. 11, 2001 entitled "Methods and Apparatus for Reduced Electronic Shelf Label Power Consumption", U.S. patent application Ser. No. 10/044,687 filed Jan. 11, 2001 entitled "Methods and Apparatus for Error Detection and Correction of an Electronic Shelf Label System Communication Error", U.S. patent application Ser. No. 10/044,439 filed Jan. 11, 2001 entitled "Methods and Apparatus for Automatically Locating an Electronic Shelf Label", U.S. patent application Ser. No. 10/044,440 filed Jan. 11, 2001 entitled "Methods and Apparatus for Conserving Battery Power in an Electronic Shelf Label System", U.S. patent application Ser. No. 10/044,688 filed Jan. 11, 2001 entitled "Methods and Apparatus for Automatic Assignment of a Communication Base Station and Timeslot for an Electronic Shelf Label", U.S. patent application Ser. No. 10/044,535 filed Jan. 11, 2001 entitled "Methods and Apparatus for Error Detection and Correction in an Electronic Shelf Label System", all of which are assigned to the assignee of the present invention and incorporated by reference herein in their entirety.

Figure 1:
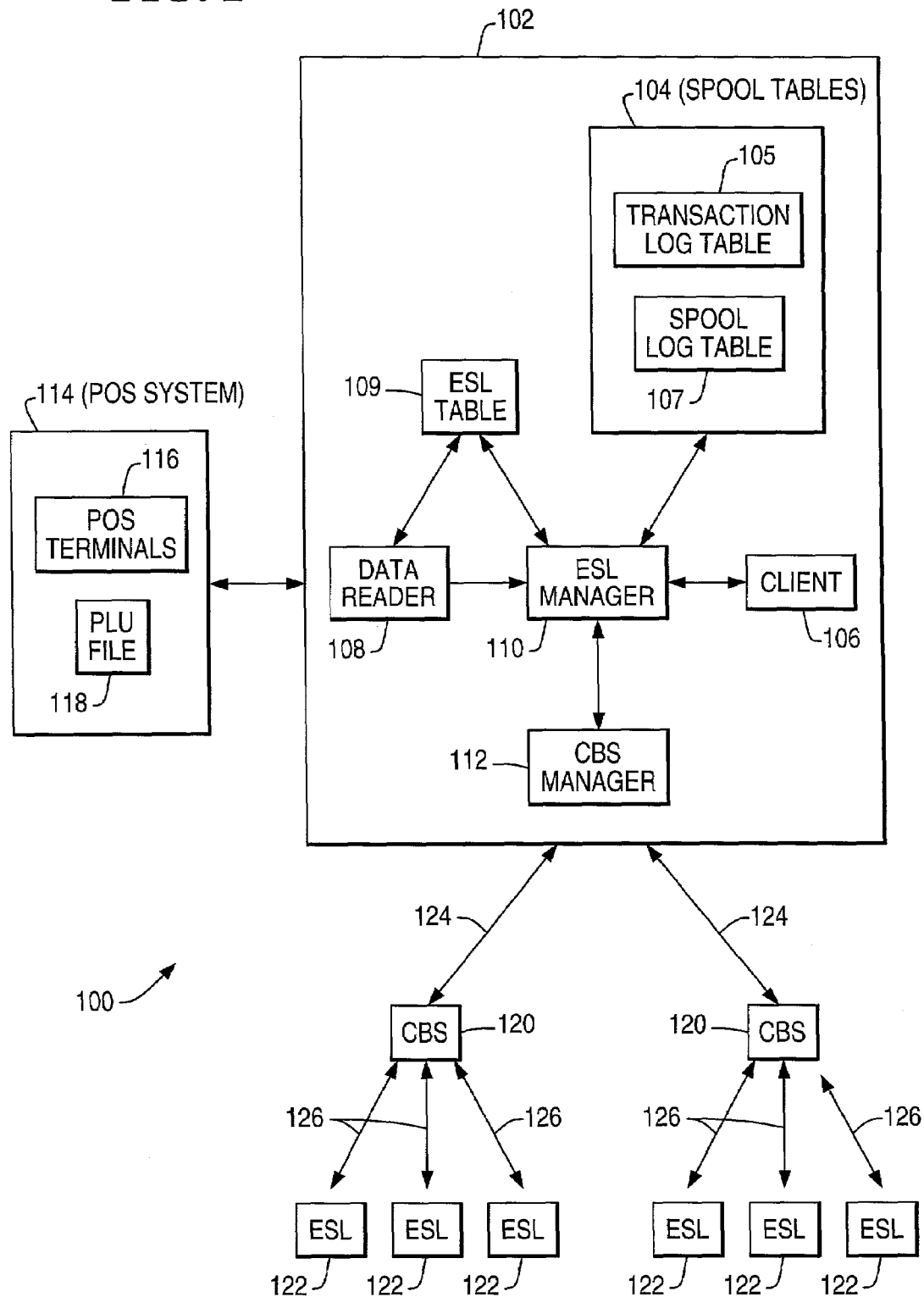
FIG. 1 shows a block diagram of a transaction management system in accordance with the present invention.

FIG. 1 shows a transaction management system 100 in accordance with the present invention. The system 100 includes an ESL host computer system 102 and a point-of-sale (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client application 106 and a communication base station (CBS) manager 112. POS system 114 includes a price look-up (PLU) file 118 and POS terminals 116.

The system 100 also includes CBSs 120 and ESLs 122. The CBSs 120 may be suitably mounted in or near the ceiling of the retail establishment. ESLs 122 are typically attached to store shelving adjacent to items. In one aspect, the system 100 includes a plurality of groups of ESLs 122 and a plurality of CBSs 120, with each group of ESLs 122 preferably assigned to one of the CBSs 120. A record of this assignment relationship is stored in system memory, for example, as part of the data stored in the ESL data file 109.

The ESL manager 110 records and schedules messages to the ESLs 122. The ESL manager 110 monitors and maintains an action list for the ESLs 122 utilizing spool tables 104 which include a transaction log table 105 and a spool log table 107. The ESL manager 110 provides a scheduling function for time related events which need to occur at a future point in time. Items or records on the action list may be provided from client applications, such as client application 106, as requests for work. These client applications may receive input from a terminal or user interface application. Additionally, items or records on the action list may be automatically generated by the ESL manager 110, or could be due to requests that required additional processing at a later date, such as, for example, a series of sale prices to be displayed at the ESLs at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS manager 112, the ESL manager 110 then updates the ESL table 109 and spool tables 104 as appropriate. Such updates may include marking a particular task as completed, updating the data image of the ESL 122, and the like. A client application, such as client application 106, may interface with the ESL manager 110 to initiate requests for a particular activity. The data reader 108 provides an interface from the ESL manager 110 to the POS system 114.

The ESL manager 110 interfaces with the transaction log table 105 and the spool log table 107, and utilizes these tables to maintain lists of actions to take. The transaction log table 105 includes a high level list and the spool log table 107 includes a low level list of actions to take. As an example, when the client application 106 makes a request to perform an update to a group of ESLs in the store, this request is processed and stored as a single record in the transaction log table 105. Since the request may affect many ESLs, the high-level transaction log request stored in the transaction log table 105 is resolved into a number of smaller requests, each affecting a specific ESL. When resolution of this record into individual requests occurs, a specific request or record for each affected ESL is created and placed in the spool log table 107. The ESL manager 110 then uses the spool log table 107 to decide what instructions to send to the CBS manager 112 by processing each spool log record and sending the indicated request to the CBS manager 112.

The ESL manager 110 includes a plurality of programming threads. A first thread loops through the transaction log table 105 looking for items to resolve into spool log records to be stored in the spool log table 107. A second thread loops through the spool log table 107 looking for items to send to the CBS manager 112. A third thread processes responses returned from the CBS manager 112. Additional threads may provide further processing capability.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes the response of a particular ESL 122 after a CBS 120 has received that response and then passed that response to the CBS manager 112. Additionally, the CBS manager 112 monitors the CBSs 120 for problems, performs diagnostics on the CBSs 120 and logs errors.

The messages are sent to the CBSs 120 through communication links 124. The communication links 124 may suitably utilize radio frequency (RF) communication, infrared (IR) communication, a wired link, or some combination of communication techniques. Groups of ESLs 122 are assigned to a particular CBS for communication. After receiving a message from the host system 102, a particular CBS 120 which has been assigned to an ESL 122 then transmits the message to the ESL 122 utilizing communication link 126, which may suitably utilize RF communication, IR communication, or some combination of communication techniques.

After receiving messages, the ESLs 122 transmit responses to CBSs 120 over communication links 126. The CBSs 120 then process and retransmit the response messages to the CBS manager 112 over communication links 124. The CBSs 120 may also detect the signal strength of the responses and report the signal strengths to the host computer system 102.

The ESL data file 109 consists of multiple records, with each record corresponding to a particular ESL 122 in a retail establishment. The record for each ESL 122 includes a number of fields, with each field containing the data which is supposed to be in one of the registers of the ESL 122. Thus, the record contains a picture, or full data image, of what data is intended to be stored in the ESL 122, and consequently, what the ESL 122 should be displaying on the ESL's display. Additionally, each record may include a variety of additional non-display information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

Figure 2:
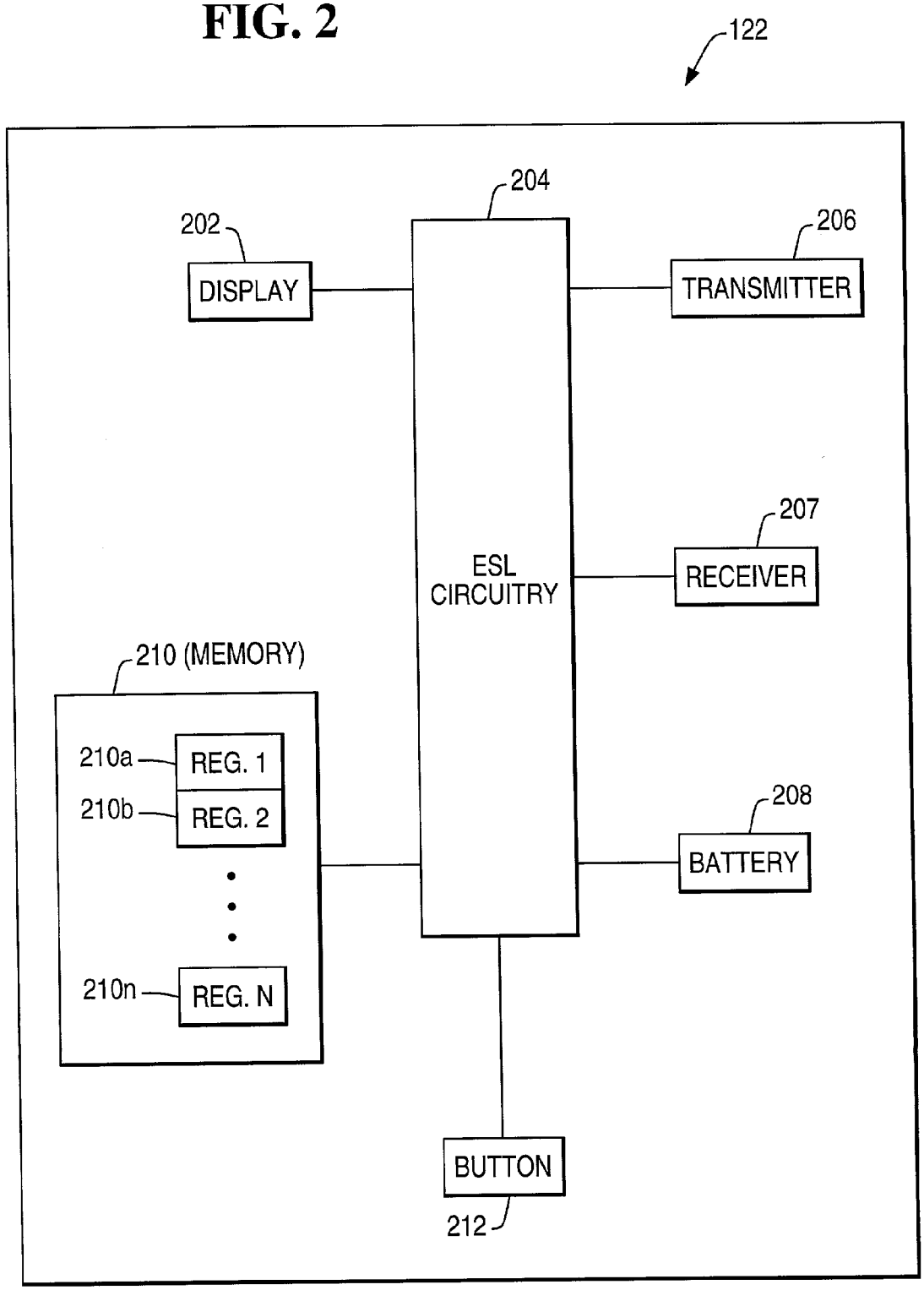
FIG. 2 is a block diagram of an ESL in accordance with the present invention.

FIG. 2 shows a block diagram of an exemplary ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication, IR communication, a wired link or some combination of communication techniques. A battery 208 provides power for the operation of ESL 122. The operation of ESL 122 is controlled by ESL circuitry 204. ESL circuitry 204 decodes incoming messages received, and performs any actions indicated by the messages. For example, if a register update message is received, the ESL circuitry 204 would cause the appropriate register to be updated with the data. ESL memory 210 includes a plurality of registers, such as registers 210a, 210b, . . . , 210n. The ESL memory 210 may contain many types of information. For example, the memory 210 may include display registers which contain the actual text to be displayed by the ESL 122. This text may include item price, informative or promotional text, text directed to store employees, and the like. Other registers may contain data which controls various parameters related to the display of the text, such as display register selection and timing sequences, for example. The ESL 122 may also include a button 212 which may be depressed to initiate a particular function, such as, for example, the display of an alternate message.

Many operations which involve ESLs 122 are periodic in nature, recurring at predetermined times. For example, a retail establishment may want to perform a bedcheck of all the store's ESLs every evening to verify that each ESL is displaying the correct information or to check for hardware errors. The present invention provides techniques which allow a single transaction request to cause recurring transactions to be scheduled by the ESL manager 110 and then executed at specified intervals.

When a transaction is created or issued by a client application, such as client application 106, multiple pieces of information may be provided by that client to the ESL manager 110, indicating what action is to be taken. To allow for the scheduling of recurring transactions, recurrence information for the transaction may also be specified by the client application. The recurrence information may include a start date and time, and a recurrence period. The recurrence information may also include an end date and time. By the client application including the recurrence period in the transaction request, the ESL manager 110 may process the request and schedule recurring transactions based on the recurrence period without requiring the client application to issue further transaction requests. If the start date and time, and recurrence period are not specified, the ESL manager 110 assumes default values of "now" and "no recurrence", respectively, indicating that the transaction is to be performed immediately, or as soon as possible, and is not to be repeated.

As described above, when an application issues a request for a transaction to the ESL manager 110, this request is processed by the ESL manager 110 and stored as a single transaction log record in the transaction log table 105. The transaction log record represents an action to be performed which may affect a portion of the ESL data file 109. To determine if anything needs to be done based on the transaction log record, the transaction log monitor thread of the ESL manager 110 looks at the record's status and the start date and time. If the transaction log record is a pending transaction and the start date and time is in the future, the record is skipped, but if the start date and time is now or in the past, the record is processed or resolved. During the resolve operation, all the necessary spool log records are generated to indicate which ESL's are affected by the record. These spool log records are then stored in the spool log table 107. The resolve operation basically involves breaking down the high-level transaction log record into one or more low-level spool log records. The resolve operation is based on which records in the ESL data file 109 match the criteria associated with the transaction record in the transaction log table 105.

When the resolve operation is finished, the ESL manager 110 looks at the recurrence period and if the recurrence period is a non-zero value, the ESL manager 110 adds the recurrence period to the start date and time to generate a new start date and time. The ESL manager 110 then generates a new transaction and stores this new transaction in the transaction log table 105 so that a future loop through the transaction log table 105 will resolve the new transaction when the new start date and time is reached. This new transaction is essentially identical to the old, with the exception of the incremented start date and time, and unique transaction identifier. As described above, the ESL manager 110 then uses the spool log table 107 to decide what to send to the CBS manager 112 by processing each spool log record and sending the indicated request to the CBS manager 112. Thus, a single transaction request submitted by a client application is repeatedly executed at the specified start date and time at the specified recurring period.

As an example of how recurring transactions in accordance with the present invention operate, assume that every night at 11:30 PM a retail establishment desires to perform a bedcheck of all the ESLs to ensure they are displaying the correct information. Rather than having to manually schedule the request every night or write a new application which operates to submit the request every night, a client application may simply create a single transaction request which includes a recurrence period. That single transaction may have a start date of, for example, Sep. 29, 2001 and a time of 11:30 PM (2001-9-29 23:30:00), and the recurrence period. The recurrence period may be specified as one day, since the bedcheck is desired to occur every day. The ESL manager 110 then creates a transaction log record corresponding to the transaction request and store this transaction log record in the transaction log table 105.

After the 11:30 PM deadline is reached on Sep. 29, 2001, the next loop through the transaction log by the transaction log monitor thread of the ESL manager 110 would resolve this record into a plurality spool log records, one for each ESL affected by the transaction log record, and store these spool log records in the spool log table 107. After the transaction log record has been resolved, the ESL manager 110 looks at the recurrence period and adds one day to the previous start date and time (2001-09-29 23:30:00) to generate a new start date and time of 2001-23:30:00. A copy of the transaction log record is then created with the new start date and time, and placed in the transaction log table 109. Thus, the next night, at 11:30 PM, the new transaction log record would get processed, thus performing the bedcheck again. This process will repeat such that a bedcheck is performed at 11:30 PM every night This type of processing may be performed for any type of transaction, such as an update, a find, a bedcheck, and the like.

FIG. 3 shows a method 300 for performing recurring ESL transactions in accordance with the present invention. In step 302, a client application issues a transaction request to an ESL manager. A transaction request is a request for work to be performed. The transaction request may suitably include the type of work (such as a bedcheck or an update), specific details about the work (such as the type of update or type of bedcheck), the start date and time, the recurrence period, which ESLs to perform the work on, a date or time for the recurrence period to end, priority information and the like. This transaction is stored in a transaction log table as a record.

In step 304, an ESL manager transaction processing thread reads the record from the transaction log table. In step 306, the ESL manager determines if the record is pending. A pending record is a record which has not yet been resolved. If the record is not pending, the method continues to step 316 and additional records are processed. If the record is pending, the method continues to step 308. In step 308, the ESL manager determines if the start date and time of the record has occurred. If the start date and time has not occurred, the method continues to step 316 and additional records are processed. If the start date and time of the record has occurred, the method continues to step 310. In step 310, the ESL manager resolves the record into individual spool log records which are stored in a spool log table. A second thread in the ESL manager processes the individual spool log records to determine which of these records should be provided to a CBS manager for processing. In step 312, the ESL manager determines if the recurrence field of the record includes a non-zero value. If the recurrence field has a value of zero, the method continues to step 316 and additional records are processed. If the recurrence field has a non-zero value, the method continues to step 314. In step 314, the ESL manager increments the start date and time by the value of the recurrence field. A copy of the record with the new start date and time is then stored in the transaction log table. Next, in step 316, the ESL manager continues to process additional records stored in the transaction log table.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

We claim:

1. A computer implemented method of performing recurring electronic shelf label (ESL) transactions comprising the steps of:
   (a) reading a transaction log record from a transaction log table, the transaction log record comprising a transaction request, a start date and time, and a recurrence period;
   (b) determining that the start date and time for the transaction log record has occurred;
   (c) processing the transaction log record;
   (d) determining that the recurrence period is not zero;
   (e) incrementing the start date and time by the recurrence period;
   (f) creating a new transaction log record including the incremented start date and time; and
   (g) storing the new transaction log record in the transaction log table.

2. The method of claim 1 further comprising the step of:
   (h) determining that the transaction log record is pending.

3. The method of claim 1 wherein processing the transaction log record comprises:
   (1) resolving the transaction log record into individual spool log records, and
   (2) storing the individual spool log records in a spool log table.

4. The method of claim 3 further comprising the steps of:
   (h) determining which individual spool log records to provide to a communication base station (CBS) manager for processing; and
   (i) providing the determined individual spool log records to the CBS manager for processing.

5. The method of claim 4 further comprising the step of:
   (j) initiating, by the CBS manager, the transmission of one or more messages to one or more ESLs based on the individual spool log records provided to the CBS manager.

6. The method of claim 1 further comprising the steps of:
   (h) receiving the transaction request; and
   (i) storing the transaction request in the transaction log table as the transaction log record.

7. The method of claim 6 wherein the transaction request includes the start date and time, and the recurrence period.

8. An electronic shelf label (ESL) system comprising:
   (a) an ESL adapted to display merchandise item information; and
   (b) a host computer adapted to:
      (1) read a transaction log record from a transaction log table, the transaction log record comprising a transaction request, a start date and time, and a recurrence period;
      (2) determine that the start date and time for the transaction log record has occurred;
      (3) process the transaction log record;
      (4) determine that the recurrence period is not zero;
      (5) increment the start date and time by the recurrence period;
      (6) create a new transaction log record including the incremented start date and time; and
      (7) store the new transaction log record in the transaction log table.

9. The system of claim 8 wherein the host computer being adapted to process the transaction log record comprises the host computer being adapted to resolve the transaction log record into individual spool log records, and store the individual spool log records in a spool log table.

10. The system of claim 9 further comprising:
    (c) a communication base station (CBS) manager adapted to process the individual spool log records.

11. The system of claim 10 wherein the host computer is further adapted to:
    (8) determine which individual spool log records to provide to the CBS manager for processing, and
    (9) provide the determined individual spool log records to the CBS manager for processing.

12. The system of claim 11 wherein the CBS manager is further adapted to initiate transmission of one or more messages to one or more ESLs based on the individual spool log records provided to the CBS manager.

13. The system of claim 8 wherein the host computer is further adapted to:
    (8) receive the transaction request; and
    (9) store the transaction request in the transaction log table as the transaction log record.

14. The system of claim 13 wherein the transaction request includes the start date and time, and the recurrence period.

* * * * *